(12) United States Patent
Shaffer et al.

(10) Patent No.: US 7,490,039 B1
(45) Date of Patent: Feb. 10, 2009

(54) TEXT TO SPEECH SYSTEM AND METHOD HAVING INTERACTIVE SPELLING CAPABILITIES

(75) Inventors: Shmuel Shaffer, Palo Alto, CA (US); Labhesh Patel, Mountain View, CA (US); Shantanu Sarkar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1137 days.

(21) Appl. No.: 10/020,102

(22) Filed: Dec. 13, 2001

(51) Int. Cl.
*G10L 13/00* (2006.01)
*G10L 21/00* (2006.01)

(52) U.S. Cl. ...................... 704/260; 704/270
(58) Field of Classification Search ............... 704/235, 704/260, 270, 270.1, 275
See application file for complete search history.

(56) References Cited

U.S. PATENT DOCUMENTS

| | | | | |
|---|---|---|---|---|
| 5,799,273 A | * | 8/1998 | Mitchell et al. | 704/235 |
| 5,960,447 A | * | 9/1999 | Holt et al. | 715/500 |
| 6,068,487 A | * | 5/2000 | Dionne | 434/178 |
| 6,199,042 B1 | * | 3/2001 | Kurzweil | 704/260 |
| 6,240,391 B1 | * | 5/2001 | Ball et al. | 704/270 |
| 6,424,357 B1 | * | 7/2002 | Frulla et al. | 715/728 |
| 2001/0013001 A1 | * | 8/2001 | Brown et al. | 704/270.1 |
| 2005/0038657 A1 | * | 2/2005 | Roth et al. | 704/260 |

\* cited by examiner

*Primary Examiner*—Angela A Armstrong
(74) *Attorney, Agent, or Firm*—Baker Botts L.L.P.

(57) ABSTRACT

A method for audibly spelling a word in an audio file includes playing an audio file to a user, receiving a command to spell a word in the audio file from the user, identifying a textual word in a text file corresponding to the word, and audibly spelling the textual word. A text-to-speech system includes a memory and a text-to-speech module. The text-to-speech module generates an audio file from a text file, and stores in the memory locations for words in the audio file corresponding to locations of words in the text file.

32 Claims, 2 Drawing Sheets

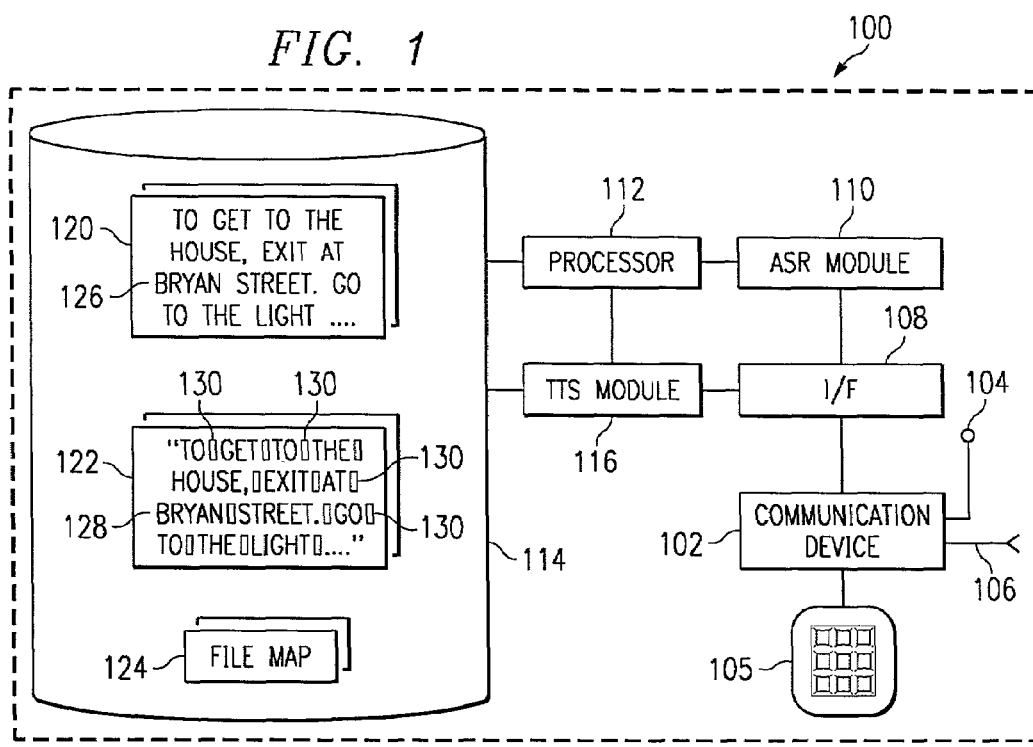
FIG. 1
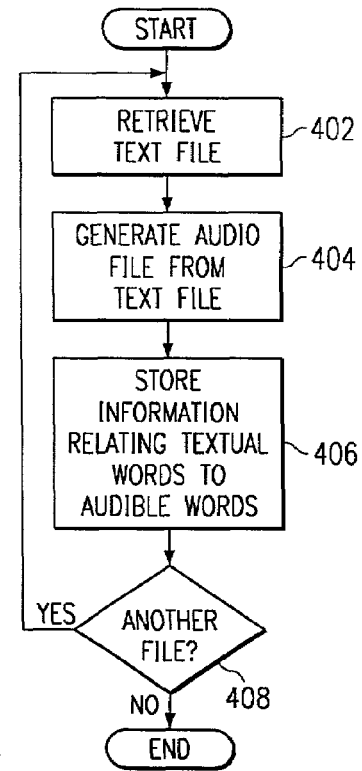
FIG. 4
| WORD NUMBER | FIRST CHARACTER | LAST CHARACTER | BEGINNING TIME (ms) | ENDING TIME (ms) |
|---|---|---|---|---|
| 1 (TO) | 1 | 2 | 0 | 500 |
| 2 (GET) | 4 | 6 | 510 | 1000 |
| 3 (TO) | 8 | 9 | 1010 | 1500 |
| 4 (THE) | 11 | 13 | 1510 | 2000 |
| 5 (HOUSE) | 15 | 19 | 2010 | 2750 |
| 6 (EXIT) | 22 | 25 | 3000 | 4000 |
| 7 (AT) | 27 | 28 | 4010 | 4500 |
| 8 (BRYAN) | 30 | 34 | 4510 | 5500 |
| 9 (STREET) | 36 | 41 | 5510 | 6250 |
| 10 (GO) | 45 | 46 | 7250 | 7750 |
| 11 (TO) | 48 | 49 | 7760 | 8250 |
| 12 (THE) | 51 | 53 | 8260 | 8750 |
| 13 (LIGHT) | 55 | 59 | 8760 | 9500 |
FIG. 2

TEXT TO SPEECH SYSTEM AND METHOD HAVING INTERACTIVE SPELLING CAPABILITIES

TECHNICAL FIELD OF THE INVENTION

This invention relates generally to text-to-speech technology and more particularly, to a text-to-speech system and method having interactive spelling capabilities.

BACKGROUND OF THE INVENTION

Systems using adaptive speech recognition (ASR) and text-to-speech (TTS) technology allow users to interact with computer systems using spoken commands. Such systems greatly increase the flexibility and accessibility of computer systems, allowing users to reach computer systems anywhere they can access a telephone. As more people come to rely on these systems, users have demanded even greater functionality in ASR and TTS technology.

SUMMARY OF THE INVENTION

In accordance with the present invention, techniques for relating audio files with text files, as well as using the relation between the audio and text files for spelling out words, are provided. In accordance with the present invention, the disadvantages and problems associated with identifying words in text files corresponding to words in audio files have been substantially reduced or eliminated.

In accordance with one embodiment of the present invention, a method for audibly spelling a word in an audio file includes playing an audio file to user, and receiving from the user a command to spell a word in the audio file. The method also includes identifying a textual word corresponding to the word to be spelled in a text file, and audibly spelling the textual word.

In accordance with another embodiment of the present invention, an interactive voice response system (IVR) includes an interface and a processor. The interface plays an audio file to a user, and receives a command to spell a word in the audio file from the user. The processor identifies the word to be spelled, identifies a textual word in a text file corresponding to that word, and audibly spells the word.

In accordance with another embodiment of the present invention, a method for relating an audio file to a text file includes retrieving a text file that includes written words and generating an audio file from the text file. The method further includes storing information relating audible words in the audio file to corresponding textual words in the text file.

In accordance with yet another embodiment of the present invention, a text-to-speech (TTS) system includes a memory and a TTS module. The memory stores the text file made of textual words and also stores an audio file made of audible words. The TTS module uses the text file to generate an audible word corresponding to each textual word in the text file and to store these audible words in an audio file. The TTS module then stores a file map in the memory that includes a first location for each audible word in the audio file, and a second location for each corresponding textual word in the text file. Accordingly, the file map synchronizes the audible words in the audio file with the textual words in the text file.

Technical advantages of the present invention include the ability to locate a textual word in a text file corresponding to an audible word. Accordingly, a system may perform processing on a textual word corresponding to an audible word. For example, a system could receive a command from a user to spell an audible word played to the user. The system could then spell the word by locating the corresponding textual word and pronouncing the individual characters of that word. Such a system is useful when the user cannot determine the spelling of the word by hearing the word, such as when the user hears a name derived from a language foreign to the user.

Another technical advantage of certain embodiments of the present invention is allowing the user with voice access to a system to distinguish words that sound the same but are spelled differently. Accordingly, the system can audibly spell the word to allow the user to determine which spelling is correct. For example, if a user of a voice-operated stock trading system wishes to verify that the user is purchasing stock in Cisco (a prominent technology supplier) rather than SYSCO (a prominent food supplier), the user could have the interactive voice system play the spelling of the company whose stock is being purchased.

Certain embodiments of the present invention may include some, all, or none of the enumerated technical advantages. These and other technical advantages can be best understood with reference to the following detailed description, figures, and claims.

BRIEF DESCRIPTION OF THE DRAWINGS

For a more complete understanding of the present invention and its advantages, reference is now made to the following description taken in conjunction with the accompanying drawings, in which:

FIG. 1 illustrates a communication system that enables interactive spelling during playback of an audio file;

FIG. 2 illustrates a file map generated by the system of FIG. 1, which associates text of a text file with audio of an audio file;

FIG. 4 is a flowchart illustrating a method for relating text files to audio files, in accordance with a particular embodiment of the present invention.

DETAILED DESCRIPTION THE INVENTION

Figure 3:
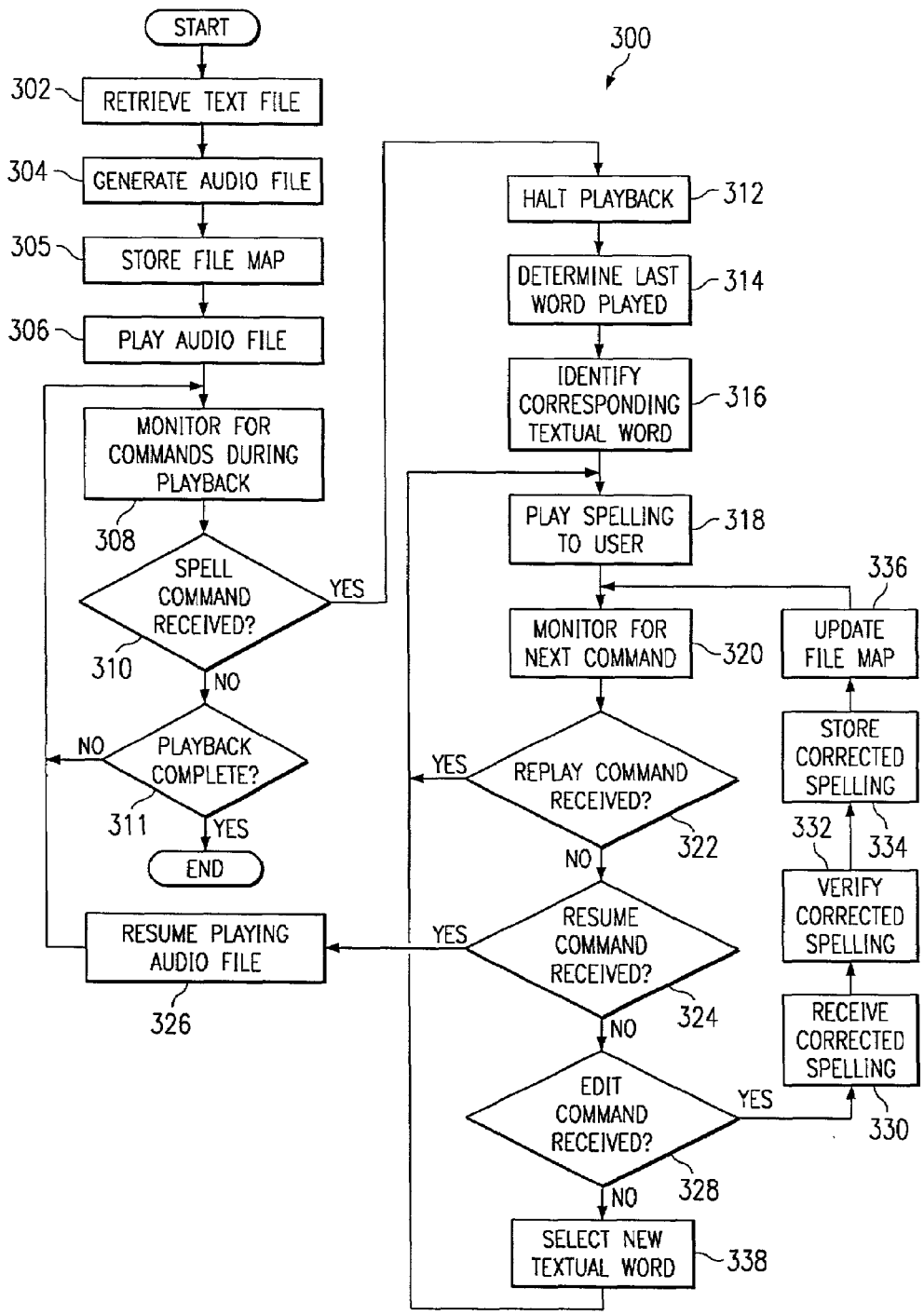
FIG. 3 is a flowchart illustrating a method for interactive spelling of words during playback of an audio file, in accordance with a particular embodiment of the present invention.

FIG. 1 illustrates a particular embodiment of a communication system 100 that creates audio files from text files and stores information relating audible words in the audio files to corresponding textual words in the text files. System 100 can therefore perform any suitable processing task that involves identifying a textual word corresponding to an audible word. For example, system 100 may play an audio file to a user of communication device 102, receive a command to spell a word in the audio file from the user, and spell the word in response to the command using the corresponding textual word.

System 100 is a text-to-speech (TTS) system that generates audio files 122 from text files 120 stored in a memory 114, allowing system 100 to read text files 120 aloud to a user with voice access to system 100. The term "text-to-speech" refers to any of a number of methods of converting electronic text into an audio form. TTS technology allows a user to access text information in system 100 without requiring a visual display. For example, the user could contact system 100 by telephone and instruct system 100 to read email to the user. System 100 may also use adaptive speech recognition (ASR) to receive voice commands from the user and to take appropriate action in response to the commands. ASR technology allows system 100 to receive speech from the user and to parse the speech into recognizable grammar, words, or vocabulary. For example, the user could say the word "spell," and system 100 could translate the word into a command recognizable by system 100.

Text files 120 used in system 100 may include letters, numbers, symbols, nonprinting characters, and any other suitable text information, some or all of which may be formed into textual words 126. Textual words 126 include any electronic representation of one or more recognizable characters that can be pronounced in a language appropriate to the characters. One example of a textual word 126 is a string of alphabetic ASCII characters.

Audio files 122 include audible words 128 that are audible pronunciations of textual words 126 formed from synthesized or recorded sounds. Audible words 128 may be separated by pauses or periods of silence to indicate the end of a sentence, the presence of a comma or dash, or any other suitable format or punctuation. The exact pronunciation and intonation of the words may be varied based on punctuation marks or other indications in text file 120. For example, if textual word 126 preceded a question mark, the corresponding audible word 128 may be pronounced with a higher pitch, a vocal inflection that is commonly used in conversation to indicate that a query is being posed. Audible words 128 may be stored in any appropriate electronic format, including WAV files, MP3 files, or any other suitable form of electronic storage.

In order to allow system 100 to identify a particular textual word 126 corresponding to an audible word 128 and vice versa, system 100 stores information that relates the locations of audible words 128 within audio file 122 to the locations of textual words 126 within text file 120. System 100 locates audible words 128 and textual words 126 using any suitable method for locating information within a file appropriate to the format of the file. For example, textual word 126 may be located in a ASCII text file by numbering the characters in the text file and recording the number of the first and last characters of the textual word. Locations of audible words 128 and textual words 126 may be stored in a file map 124 that relates each audible word 128 to a corresponding textual word 126.

In an alternative embodiment, the positions of audible words 128 are marked within audio file 128 itself using voice tags 130. Voice tags 130 are electronic markers within audio file 128 that indicate the position of words within audio file 128. In a particular embodiment, system 100 removes voice tags 130 during playback and keeps track of the number of words played by counting the number of voice tags 130 removed.

System 100 may use the information in file map 124 to locate textual words 126 corresponding to audible word 128 and to perform suitable processing on textual word 126. In a particular embodiment, system 100 may spell audible word 122 by identifying the corresponding textual word 126 and pronouncing the individual characters of the corresponding textual word 126. Audible spelling is a useful feature when the user of system 100 has only voice access to system 100 and thus cannot distinguish words that sound alike but are spelled differently, such as "night" and "knight," or in any other circumstances where the user has difficulty determining the spelling of a word. For example, if the name of a person or a street is derived from a language foreign to the user, the user might not be able to determine the spelling of the name from its pronunciation alone. Consequently, such a user would find it advantageous to hear the spelling of the name as well.

The components of system 100 are described in greater detail below. As depicted in FIG. 1, system 100 includes an interface 108 that communicates with a communication device 102, an adaptive speech recognition (ASR) module 110, a processor 112, a memory 114 and a text-to-speech (TTS) module 116. Although system 100 is illustrated with particular components, it is understood that the functions of various components of system 100 may be performed by single components or distributed amongst several components and that components of system 100 may be omitted, replaced or added without substantially changing the overall operation of system 100.

Communication device 102 allows a user to communicate with system 100 using speech. Device 102 converts the speech received from the user into an electronic form and communicates that information to system 100. Device 102 includes a microphone 104 that receives speech from the user and a speaker 106 that plays back audio information from system 100 to the user. Device 102 may also include a keypad 105 or other suitable input device for receiving information from the user.

Interface 108 receives information from communication device 102 and communicates information from system 100 to device 102. Interface 108 includes any port or connection, real or virtual, that allows system 100 to exchange information with communication device 102. Interface 108 may receive and transmit information using wires, or may be a wireless interface that decodes wireless signals into information for system 100.

ASR module 110 interprets speech received from the user into text and commands. ASR module 110 may be implemented as hardware, software, or any combination of the two. ASR module 110 communicates with other components of system 100; for example, ASR module 110 may communicate commands to processor 112.

Processor 112 represents a microprocessor, microcontroller, digital signal processor (DSP), or any other hardware and/or software configured to process information. Processor 112 manages components of system 100. Processor 112 can also execute commands received from the user of system 100, such as commands parsed from the user's speech by ASR module 110 or entered using keypad 105.

Memory 114 represents any volatile or non-volatile memory, including magnetic media, optical media, read-only memory (ROM), random access memory (PAM), removable media, CD-ROMs, DVD-ROMs, or any other suitable local or remote memory component. Memory 114 stores text files 120, audio files 122, and file maps 124 relating text files 120 to audio files 122. Memory 114 may be accessed by one or more components of system 100 to store information. For example, ASR module 110 may convert speech from the user into electronic form and store the speech as a text file 120 in memory 114.

TTS module 116 represents any hardware and/or software that generates audio files 122 from text files 120 and stores information relating audible words 128 in audio file 122 to textual words 126 in text file 120. TTS module 116 performs any suitable processing to identify textual words 126, to generate audible words 128, and to store audible words 128 in any suitable electronic form. TTS module 116 may also play back audio file 128 by converting audio file 128 into media stream packets for any suitable audio output device. Media stream packets include any packet, cell, frame, segment or portion of data suitable for storing and communicating audio information in electronic form. For example, TTS module 116 could convert audio file 128 into media stream packets that are transmitted to device 102 via interface 108. To audibly spell textual words 126, TTS module 116 identifies the characters in a textual word 126, determines a pronunciation for each of the characters, and uses the pronunciation of the characters to generate electronic information, control signals or any other suitable form of audio information corresponding to the pronunciation of the characters. In another embodiment, TTS module 166 retrieves an electronically stored sound corresponding to the character, such as "A," "B," or "C," and plays the sound back to the user.

In one example of system 100 in operation, system 100 retrieves a text file 120 from memory 114. Text file 120 may be created by any source including local components of system 100 as well as remote systems. In a particular embodiment, text file 120 is generated from email, content of a database, content of web pages, or other suitably stored information. Alternatively, text file 120 may be generated from the speech of a user of system 100 by ASR module 110. System 100 uses TTS module 116 to generate audible words 128 corresponding to the textual words 126 in text file 120 and to store audible words 128 in an audio file 122. TTS module 116 also generates file map 124 that includes locations for each audible word 128 within audio file 122 and corresponding locations of textual words 126 within text file 120. Accordingly, file map 124 provides a mechanism for synchronizing audio file 122 with text file 120.

After audio file 122 is created, system 100 converts audio file 122 and plays audio file 122 to user using speaker 106. During playback, user might hear a word that user wants to have spelled by system 100. In the particular embodiment shown, for example, the user may wish to determine whether "Bryan" in "Bryan Street" is spelled "Bryan" or "Brian." Or the user may want to clarify whether system 100 played back "Go to the light" rather than "Go to the right."

To have system 100 spell a word, the user utters a command to spell the word into microphone 104. Because the command is received during playback, it is referred to as a "barge-in command." ASR module 110 interprets the command and instructs processor 112 to spell the word in response to the command. System 100 then halts playback of audio file 122, and determines the last audible word 128 that was played from audio file 122. System 100 determines a textual word 126 in text file 120 corresponding to the audible word 128 last played from audio file 122 using file map 124. Once the proper textual word 128 has been located, TTS module 126 can spell out the textual word 128 by pronouncing the individual characters of the textual word 128.

Once the word has been spelled, system 100 may receive follow-up commands from the user. If a word has been misspelled, the user may utter a command to correct the spelling of the word, and system 100 then receives the correct spelling from the user and modifies the spelling in text file 120. If the user prefers to have another word spelled, the user utters a command such as "previous", "next", "entire paragraph," or any other appropriate direction for system 100. System 100 then selects a new word in text file 120, and spells the word. Alternatively, system 100 may play a prompt to user which includes the word, such as "Is <word> the word you want to spell?" System 100 then receives feedback from the user and either spells the word or selects a new word. Once the user has received the spelling for each of the words that the user wishes to have spelled, the user can utter a "resume" command that instructs system 100 to resume playing audio file 122 where it left off previously.

In another example of system 100 in operation, system 100 converts each textual word 126 of text file 120 into a separate audio file 122. In this alternative mode of operation, system 100 stores file map 124 that identifies the audio file 122 that corresponds to each textual word 126. Instead of playing a single audio file 122 to user, system 100 plays a sequence of audio files 122 corresponding to the order of words in text file 120. When the user requests the spelling for a word, system 100 determines the last audio file 122 that was played before the command was received. System 100 then determines textual word 126 corresponding to the last audio file 122 played using file map 124, and plays the spelling of that textual word 126 to the user.

In still another example of system 100 in operation, system 100 generates media stream packets from text file 120 and plays them back continuously, rather than storing all of the audio information in audio file 122 before playing the audio information back. Conceptually, this is analogous to system 100 reading text file 120 aloud in real time. In this specific embodiment, audio information is stored only briefly before it is played back, so audio file 122 functions as a virtual file, a transitory form of electronic storage for media stream packets. Since audio information is stored only transitorily, there is no need to store information relating audio file 122 to text file 120. Instead, system 100 need only determine the last text word 126 from which an audible word 128 was generated. For example, system 100 could use a counter to keep track of the number of text words 126 in text file 122 that have been "read" to the user in the form of audible words 128. In other embodiments, system 100 may store more complicated information, such as a file map 124 relating each textual word 126 to a time at which the corresponding audible word 128 was played.

System 100 and its modes of operation are examples of an interactive spelling system, but numerous variations and modifications will be apparent to one skilled in the art. For example, instead of speaking commands to system 100, the user could enter them directly using keypad 105 or any other suitable input device. Other modifications include more complicated text processing, such as allowing the user to insert new text or perform more complicated editing functions. Because system 100 may be modified in a number of ways without substantially affecting the overall functions of system 100, the description of system 100 should be viewed as illustrative rather than restrictive.

FIG. 2 illustrates a sample file map 200 for text file 120 and audio file 122 depicted in FIG. 1. File map 200 includes for each word a word number 202 identifying the word 126, a first character 204, a last character 206, a beginning audio time 208, and an ending audio time 210. Word number 202 corresponds to the ordering of the textual words 126 within text file 120, and identifies each textual word 126 in text file 120. For example, the fifth word in the sample passage is "house," so its word number 202 is five. First character 204 indicates the character number within the text file 120 at which each word starts, and last character 206 is a character at which it ends. Similarly, beginning audio time 208 and ending time 210 indicate the time at which corresponding audible words 128 within audio file 122 will be played during playback.

File map 200 provides information that would not be available from text file 120 alone. For example, the word "Street" is at the end of a sentence, so it is followed by a period and two spaces before the next word "Go," as indicated by the difference between last character 206 of "Street" and first character 204 of "Go." Because of the period, the separation between the corresponding audible words 128 is somewhat longer to reflect the pause introduced by the punctuation, as indicated by the pause between the ending time 210 of "Street" and the beginning time 208 of "Go." It can be difficult, however, to ascertain the exact length of a particular pause solely from the character separation. Similarly, the duration of particular audible words 128 may be only loosely correlated with the number of characters in the corresponding textual words 126. For example, "Street" has more characters than "Bryan," but "Bryan" takes longer to pronounce because it has an additional syllable. These examples illustrate some of the difficulties associated with attempting to calculate the correspondence between audio files 122 and text files 120 using only the information in a text file 120. But file map 200 provides exact positions for textual words 126 and audible words 128, thus obviating the need for error-prone calculations to locate audible words 128 within audio file 122.

The information in file map 200 can be suitably modified by one skilled in the art. For example, locations in audio file 122 could be labeled by byte numbers or other identifiers that specify a memory location within audio file 122. The byte numbers could then be used to locate particular audible words 128 within audio file 122. In another modified form, the structure of file map 200 may be different from the depicted table. For example, system 100 may use voice tags 130 or other labels within audio file 122 itself that indicate the locations of audible words 128. File map 200 should not be construed to exclude such modifications; rather, it should be taken as an illustrative example of such possibilities.

FIG. 3 is a flowchart 300 illustrating a method for interactive spelling using system 100. System 100 retrieves text file 120 at step 302. TTS module 116 generates audio file 122 from text file 120 at step 304, and also stores file map 124 relating audio file 122 to text file 120 at step 305. At step 306, system 100 plays audio file 122 to the user of system 100.

During playback, system 100 monitors for commands from the user at step 308. The system determines if a command has been received at step 310. If no command has been received, system 100 determines whether audio file 122 has been played completely at step 311. If audio file has not been completely played, system 100 continues to play audio file 122 and monitor for commands during playback at step 308.

If a spell command is received, system 100 halts playback of audio file 122 at step 312. System 100 then determines the last audible word 128 that was played from audio file 122 at step 314. Using file map 124, system 100 identifies textual word 126 corresponding to the last audible word 128 played at step 316. System 100 plays the spelling of textual word 126 to user at step 318. System 100 then monitors for another command at step 320.

At step 322, system 100 determines whether it has received a command to replay the spelling. If system 100 receives a replay command, system 100 replays the spelling at step 318, and then continues to monitor for new commands at step 320. If system 100 does not receive a replay command, system 100 determines whether it has received a command to resume playback of audio file 122 at step 324. If a command to resume has been received, then at step 326, system 100 resumes playing audio file 122 where it left off. During playback, system 100 continues to monitor for new commands at step 308.

If neither a replay nor a resume command is received, system 100 determines if it received an edit command at step 328. If system 100 receives an edit command, system 100 receives a corrected spelling from the user at step 330. At step 332, system 100 verifies the corrected spelling, such as by playing the spelling back to the user, and system 100 then stores the corrected spelling in text file 120 at step 334. After the corrected spelling is stored, system 100 updates file map 124 to reflect the correction to text file 120 if necessary. For example, file map 124 could be updated if the number of characters in the corrected textual word 126 is different from the original textual word 126. Once the corrected spelling is stored and file map 124 is updated, system 100 monitors for the next command at step 320.

If none of the above commands are received, system 100 interactively selects a new word to spell at step 334. For example, system 100 could prompt the user to select a new word and respond to commands such as "previous" or "next." Once the new word is selected, system 100 plays the spelling of the new word at step 318, and continues monitoring for commands at step 320.

Numerous variations and modifications of the method presented will be apparent to one skilled in the art. For example, additional commands could be added, and particular steps in the method could be omitted, added, rearranged, or replaced without substantially affecting the overall operation of the method. Consequently, flowchart 300 should be viewed as an example of a method having interactive spelling capabilities rather than as an exclusive definition of such a method.

FIG. 4 is a flowchart 400 illustrating one embodiment of a method for relating text files 120 to audio files 122. System 100 retrieves text file 120 at step 402. Text file 120 may be stored locally or remotely and may be generated from email, retrieved from a database or a web page, input by a user, or produced by any other suitable method. System 100 generates audio file 122 from text file 120 at step 404. At step 406, system 100 stores information relating audible words 128 in audio file 122 to textual words 126 in text file 120. System 100 determines whether another text file 120 needs to be converted at step 408. If so, system 100 can repeat the method from step 402 for the next text file 120.

Again, the method is subject to numerous modifications by a person skilled in the art. Various steps of the method may be added, omitted, rearranged, replaced, and performed concurrently and/or continuously without substantially affecting the overall operation of the method. Consequently, flowchart 400 should be viewed as one of many possible examples of a method for relating textual words 126 in text file 120 to audible words 128 in audio file 122.

Although the present invention has been described with several embodiments, a myriad of changes, variations, alternations, transformations, and modifications may be suggested to one skilled in the art, and it is intended that the present invention encompass such changes, variations, alternations, transformations and modifications as fall within the scope of the appended claims.

What is claimed is:

1. A text-to-speech (TTS) system, comprising:
    a memory operable to store a text file and an audio file; and
    a TTS module operable to:
        convert a plurality of textual words in the text file to a plurality of audible words;
        store the audible words in an audio file, the audio file including a plurality of electronic markers embedded in the audio file; and
        store for each audible word:
            a first location locating the audible word in the audio file; and
            a second location locating the corresponding textual word in the text file; and
        transmit the audible words to a telecommunication device operable to play the audio file to a user;
    an output device operable to play the audio file to a user;
    an interface operable to receive a voice command to spell one of the audible words during the playing of the audio file; and
    a processor operable to:
        remove the electronic markers from the audio file during playback;
        track the number of words played by counting the number of electronic markers removed;

determine the textual word corresponding to the audible word to be spelled; and audibly spell the textual word.

2. A method for relating words in an audio file to words in a text file, comprising:

retrieving a text file comprising a textual word;

converting the textual word to an audible word;

storing the audible word in an audio file, the audio file including a plurality of electronic markers embedded in the audio file;

storing a file map, the file map comprising:

a first location locating the audible word within the audio file; and a second location locating the textual word within the text file; and transmitting the audio file to a telecommunication device operable to play the audio file to a user;

removing the electronic markers from the audio file during playback;

tracking the number of words played by counting the number of electronic markers removed;

receiving a voice command from a user to spell the audible word;

determining that the textual word corresponds to the audible word; and audibly spelling the textual word.

3. The method of claim 2, further comprising repeating the steps of the method for a plurality of textual words in the text file.

4. A method for relating words in an audio file to words in a text file, comprising:

retrieving a text file comprising a plurality of textual words;

converting the plurality of textual words to a plurality of audible words, each audible word comprising media stream packets;

storing information relating each audible word to a corresponding textual word, wherein the information comprises a plurality of electronic markers embedded in the audio file;

transmitting the audible words to a telecommunication device associated with a user in real time as the audible words are generated;

removing the electronic markers from the audio file during playback;

tracking the number of words played by counting the number of electronic markers removed;

during the playing of the audible words, determining a current textual word corresponding to the audible word currently being played.

5. The method of claim 4, wherein the textual words comprise ASCII text.

6. The method of claim 4, further comprising:

after each audible word is played, storing information about the audible word, the information comprising:

an identifier for the textual word corresponding to the audible word; and a time at which the audible word was played.

7. The method of claim 4, wherein the steps of the method are performed by logic embodied in a computer readable medium.

8. A method for relating words in an audio file to words in a text file, comprising:

retrieving a text file comprising a textual word;

converting the textual word to an audible word, the audible word comprising media stream packets;

storing an identifier for the textual word;

repeating the steps of the method for a plurality of textual words in the text file to generate an audio file of a plurality of audible words;

storing information relating each audible word to a corresponding textual word, wherein the information comprises a plurality of electronic markers embedded in the audio file;

transmitting the audio file to a telecommunication device operable to play the audio word to a user;

removing the electronic markers from the audio file during playback; and tracking the number of words played by counting the number of electronic markers removed.

9. The method of claim 8, further comprising repeating the steps of the method for a plurality of textual words in the text file.

10. The method of claim 8, further comprising:

receiving a command from a user to spell the audible word;

determining that the textual word corresponds to the audible word; and audibly spelling the textual word.

11. A method for audibly spelling a word in an audio file, comprising:

retrieving a text file comprising a textual word;

converting the textual word to an audible word, the audible word comprising media stream packets;

storing the audible word in an audio file, the audio file comprising a plurality of audible words converted from a plurality of textual words and a plurality of electronic markers embedded in the audio file;

playing the audio file to a user;

removing the electronic markers from the audio file during playback;

tracking the number of words played by counting the number of electronic markers removed;

receiving from the user a voice command to spell an audible word in the audio file;

in response to the voice command, using the number of electronic markers removed to identify in a text file a textual word corresponding to the audible word; and audibly spelling the textual word.

12. The method of claim 11, wherein receiving the command comprises receiving a barge-in command during the playing of the audio file, and the method further comprises:

stopping the playback of the audio file;

identifying the last word played before the barge-in command was received; and selecting the last word played as the audible word to be spelled.

13. The method of claim 12, further comprising:

receiving a command from the user to resume playing the audio file; and playing the audio file from the point at which playback was stopped.

14. The method of claim 11, further comprising:

receiving a command from the user to select a new textual word from the text file; and audibly spelling the new textual word.

15. An interactive voice response server (IVR), comprising:

an interface operable to:

play an audio file to a user, the audio file comprising a plurality of audible words converted from a plurality of textual words and a plurality of electronic markers embedded in the audio file; and receive a voice command to spell an audible word in the audio file from the user; and a processor operable to:
  remove the electronic markers from the audio file during playback;
  track the number of words played by counting the number of electronic markers removed;
  identify an audible word to be spelled in response to the voice command to spell;
  in response to the voice command, identify a textual word in a text file corresponding to the audible word to be spelled; and
  audibly spell the textual word.

16. The IVR of claim 15, further comprising an adaptive speech recognition (ASR) module operable to:
  receive speech from the user; and
  parse the speech into recognizable grammar, words or vocabulary.

17. The IVR of claim 15, wherein:
  the interface is further operable to receive a command from the user to resume playing the audio file; and
  the processor is further operable to resume playing the audio file in response to the command.

18. The IVR of claim 15, wherein:
  the interface is further operable to receive a command to select a new textual word from the text file; and
  the processor is further operable to select and to audibly spell the new textual word.

19. A computer readable medium encoded with logic capable of being executed by a processor to perform the steps of:
  retrieving a text file comprising a textual word;
  converting the textual word to an audible word, the audible word comprising media stream packets;
  playing an audio file to a user, the audio file comprising a plurality of audible words converted from a plurality of textual words and a plurality of electronic markers embedded in the audio file;
  removing the electronic markers from the audio file during playback;
  tracking the number of words played by counting the number of electronic markers removed;
  receiving from the user a voice command to spell an audible word in the audio file;
  in response to the voice command, identifying in a text file a textual word corresponding to the audible word; and
  audibly spelling the textual word.

20. The logic of claim 19, wherein receiving the command comprises receiving a barge-in command during the playing of the audio file, and the logic is further operable to perform the steps of:
  stopping the playback of the audio file;
  identifying the last audible word played before the barge-in command was received; and
  selecting the last audible word played as the audible word to be spelled.

21. The logic of claim 19, wherein the logic is further operable to perform the steps of:
  receiving a command from the user to resume playing the audio file; and
  playing the audio file approximately from a point at which playback was stopped.

22. The logic of claim 19, wherein the logic is further operable to perform the steps of:
  receiving a command from the user to select a new textual word from the text file; and
  audibly spelling the new textual word.

23. A computer readable medium encoded with logic capable of being executed by a processor to perform the steps of:
  selecting a textual word in a text file;
  converting the textual word to an audible word;
  storing the audible word in an audio file;
  storing a file map, the file map comprising:
    a first location locating the audible word within the audio file; and
    a second location locating the textual word within the text file; and
  transmitting the audio file to a telecommunication device operable to play the audio file to a user;
  removing the electronic markers from the audio file during playback;
  tracking the number of words played by counting the number of electronic markers removed;
  receiving a voice command from a user to spell the audible word;
  determining that the textual word corresponds to the audible word; and
  audibly spelling the textual word.

24. The logic of claim 23, further operable to repeat the steps for a plurality of textual words in the text file.

25. A method for synchronizing audible words with textual words in a text file, comprising:
  retrieving a text file comprising a plurality of textual words;
  generating a plurality of audio files by converting the plurality of textual words to a plurality of audible words, each audio file comprising an audible word corresponding to one of the textual words;
  for each audio file, storing information relating the audio file to the corresponding textual word, the information comprising an electronic marker within the audio file that indicates the position of the audible word within the text file user;
  removing the electronic markers from the audio file during playback; and
  tracking the number of words played by counting the number of electronic markers removed.

26. The method of claim 25, wherein the steps are performed by logic embodied in a computer readable medium.

27. A system for spelling words in an audio file, comprising:
  means for playing an audio file to a user, the audio file comprising a plurality of audible words converted from a plurality of textual words;
  means for removing the electronic markers from the audio file during playback;
  means for tracking the number of words played by counting the number of electronic markers removed;
  means for receiving from the user a voice command to spell an audible word in the audio file;
  means for identifying in a text file a textual word corresponding to the audible word in response to the voice command; and
  means for audibly spelling the textual word.

28. A method for relating words in an audio file to words in a text file, comprising:
  retrieving a text file comprising a plurality of textual words;
  generating an audio file by converting the plurality of textual words to a plurality of audible words;
  storing information relating each audible word to a corresponding textual word, wherein the information comprises a plurality of electronic markers embedded in the audio file;

transmitting the audio file to a telecommunication device operable to play the audio file to a user;

removing the electronic markers from the audio file during playback; and tracking the number of words played by counting the number of electronic markers removed.

29. The method of claim 28, wherein the textual words comprise ASCII text.

30. The method of claim 28, wherein the audio file is stored in the form of a WAV file.

31. The method of claim 28, wherein the information comprises a file map relating a location of each textual word within the text file to a location of the corresponding audible word in the audio file.

32. The method of claim 28, wherein the steps of the method are performed by logic embodied in a computer readable medium.

* * * * *